Nov. 13, 1962     A. B. BLACKBURN     3,063,503
AIR DRIVEN TURBINE
Filed Jan. 19, 1959     2 Sheets-Sheet 1
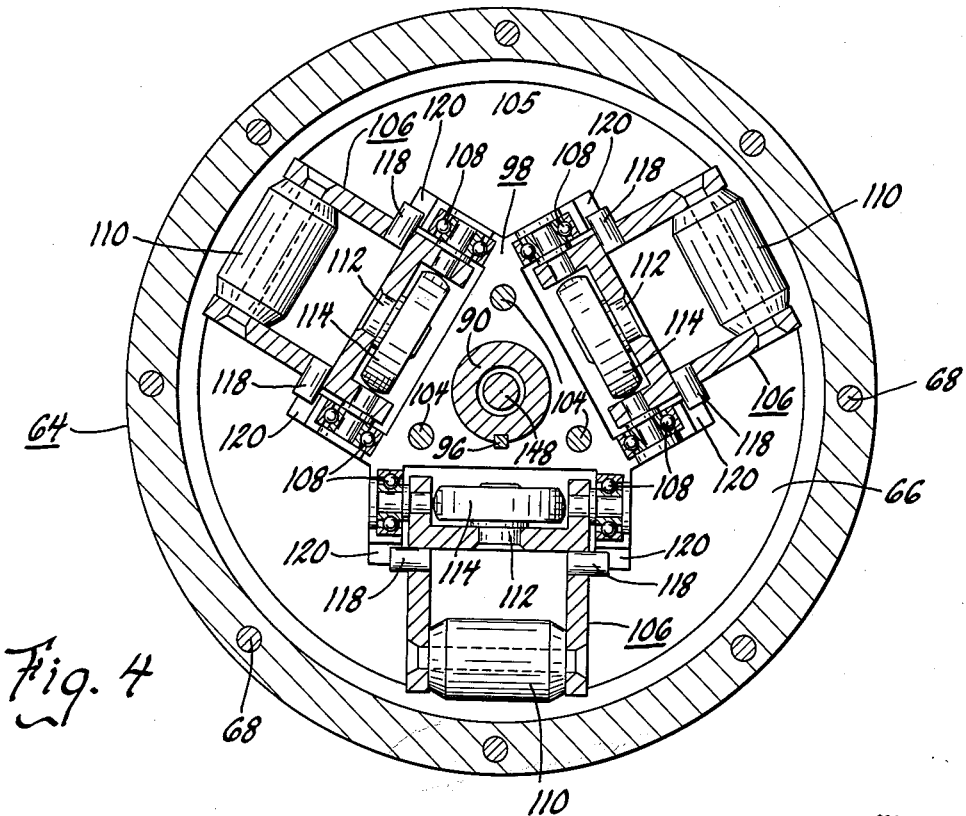
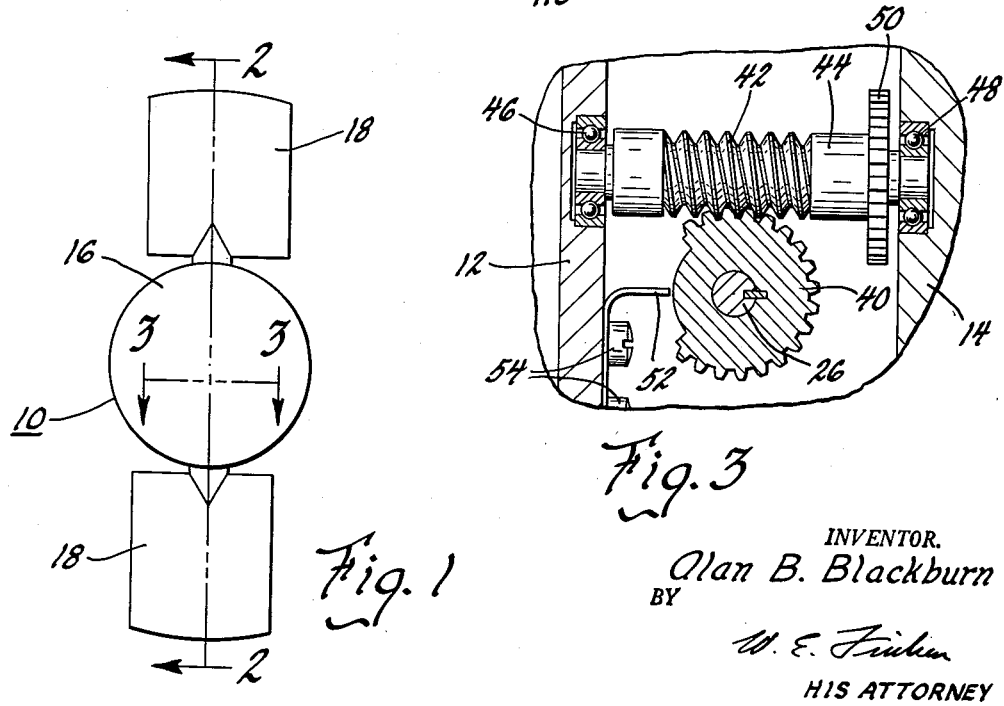
INVENTOR.
Alan B. Blackburn
BY
W. E. Finken
HIS ATTORNEY Nov. 13, 1962  A. B. BLACKBURN  3,063,503
AIR DRIVEN TURBINE
Filed Jan. 19, 1959  2 Sheets-Sheet 2

INVENTOR.
Alan B. Blackburn
BY
W. E. Finken
HIS ATTORNEY

United States Patent Office 3,063,503
Patented Nov. 13, 1962

3,063,503
AIR DRIVEN TURBINE
Alan B. Blackburn, Troy, Ohio, assignor to General Motors Corporation, Detroit, Mich., a corporation of Delaware
Filed Jan. 19, 1959, Ser. No. 787,692
7 Claims. (Cl. 170—68)

This invention pertains to air driven turbines, and particularly to a variable pitch air driven turbine including isochronous governing means for maintaining turbine speed substantially constant.

Heretofore, variable pitch air driven turbines have been manufactured which embody a spring-flyweight droop governor that is operable to maintain turbine speed within preselected limits. An air driven turbine of this type is shown in my copending application Serial No. 756,894 filed August 25, 1958, now Patent 3,013,613. However, in some instances it is necessary to maintain turbine speed substantially constant at a preselected speed setting, and this type of operation cannot be accomplished with a spring-flyweight droop type governor. The present invention relates to an air driven turbine embodying isochronous governing means which are operable to maintain turbine speed substantially constant irrespective of changing loads or variations in the velocity of the air stream. Accordingly, among my objects are the provision of an isochronous governor means for a variable pitch air driven turbine; the further provision of isochronous governing means designed particularly for use with high speed air driven turbines; the further provision of isochronous governing means of the aforesaid type including means for adjusting the speed setting thereof; and the still further provision of a roller type isochronous governor for a variable pitch air driven turbine.

The aforementioned and other objects are accomplished in the present invention by incorporating roller means on a plurality of spring biased, centrifugally responsive flyweight arms. Specifically, in the disclosed embodiment the air driven turbine comprises a hub having a pair of blades journalled therein for rotation about their longitudinal axes for pitch adjustment from a substantially flat pitch position to a full feathered pitch position. Each blade has a worm gear sector attached to the root portion thereof, the sectors meshing with worms. The worms are formed on shafts having gears thereon which mesh with a pitch adjusting master gear.

The turbine blades impart rotation to the hub when it is positioned in an air stream. The master gear is attached to a shaft rotatably journalled in the hub. The worm gear shafts are journalled in the hub, and hence rotate about the master gear. The master gear is driven in the same direction as the hub under the control of the isochronous governor such that when turbine speed is equal to the governor speed setting, the master gear and the hub will be rotating in the same direction at the same speed. Hence, there will be no speed difference between the worm shaft gears and the master gear, and thus the worm shafts will not be rotated about their longitudinal axes.

However, when turbine speed exceeds the speed setting of the governor, the master gear will be rotated at a speed slower than turbine speed. Hence, the worm shafts will be rotated about their longitudinal axes in one direction thereby turning the blades to a higher pitch angle so as to reduce the turbine speed. Conversely, when turbine speeds are less than the speed setting of the governor, the master gear will be rotated at a speed faster than the turbine. Therefore, the worm shafts will be rotated about their longitudinal axes in the opposite direction to reduce the pitch angle of the blades and facilitate an increase in turbine speed.

The hub is drivingly connected with any suitable accessory, such as a generator or a pump, and is also connected through a gear reduction to a centrifugal flyweight assembly constituting a part of the isochronous governor. The flyweight assembly comprises a yoke member having a plurality of radially extending arms pivotally connected thereto which carry flyweights at their outer ends. In addition, each arm has a roller, or wheel, journalled therein, which roller engages a stationary cam and a rotatable race member. The cam is supported by a Belleville spring washer constituting the spring means for opposing outward movement of the flyweights. The stress of the spring means is adjustable to vary the speed setting of the isochronous governor.

The race member is connected to the master gear shaft and is driven by the rollers upon rotation of the hub. The speed of rotation of the race member is determined by the algebraic sum of the speeds of the wheels about their own axes and the speed of the flyweight assembly about the axis of the hub. The speed of rotation of the rollers about their own axes is dependent upon the speed of rotation of the hub and the angular position of the flyweight arms, which determines the radius of the drive circle between the rollers and the race member. As alluded to hereinbefore, the speed of the master gear driven by the race member will be equal to turbine speed when the turbine speed is equal to the speed setting of the governor.

Further objects and advantages of the present invention will be apparent from the following description, reference being had to the accompanying drawings, wherein a preferred embodiment of the present invention is clearly shown.

In the drawings:

FIGURE 1 is a front view in elevation of an air driven turbine constructed according to the present invention.

FIGURE 3 is an enlarged fragmentary view taken along line 3—3 of FIGURE 1.

FIGURE 4 is a sectional view taken along line 4—4 of FIGURE 2.

Figure 2:
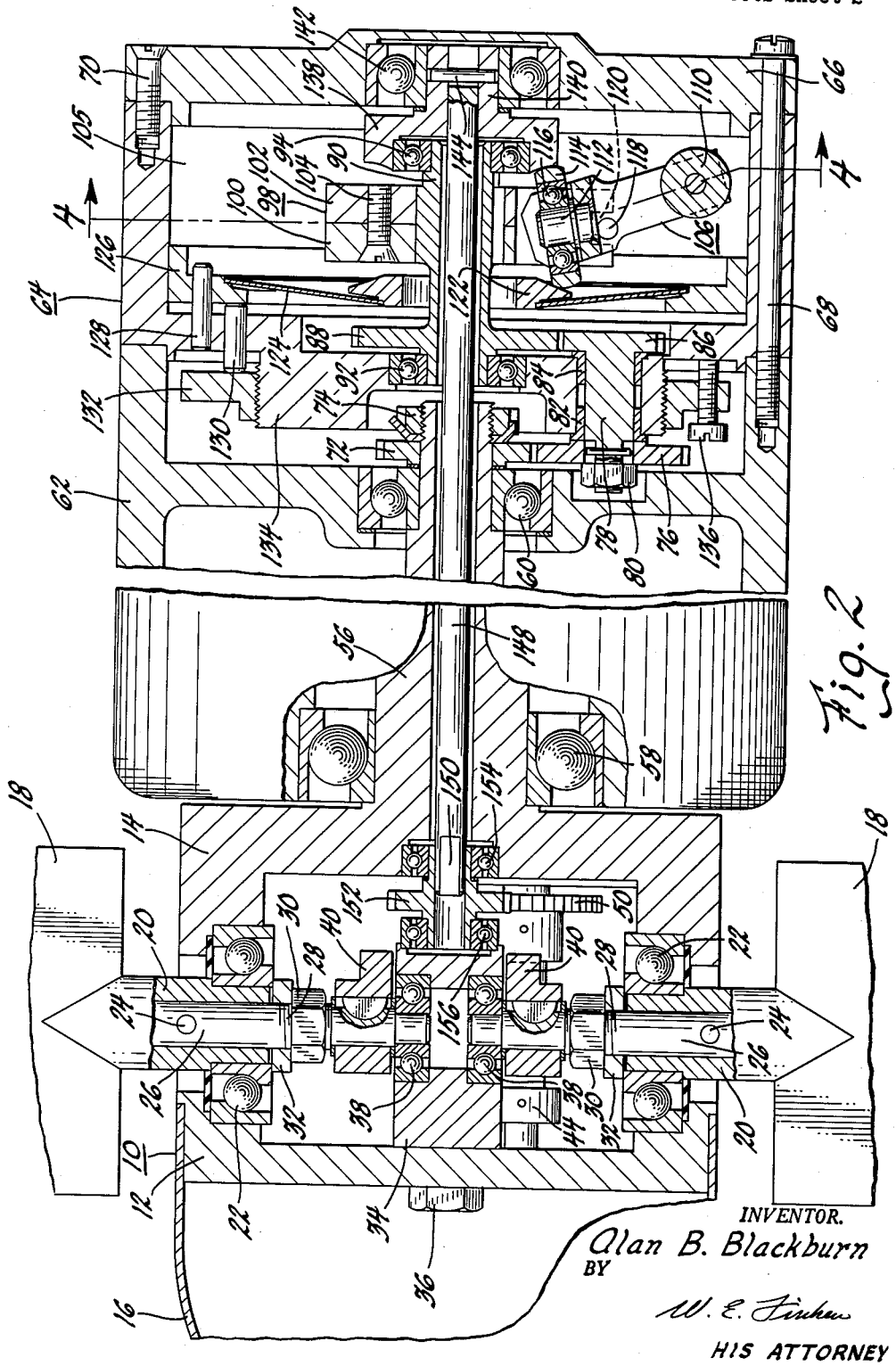
FIGURE 2 is an enlarged fragmentary view, partly in section and partly in elevation, taken generally along line 2—2 of FIGURE 1.

With particular reference to the drawings, the air driven turbine comprises a hub 10 which includes a pair of cup-shaped members 12 and 14 which are fastened together by any suitable means, not shown. A substantially parabolic spinner shell 16 is suitably attached to the hub section 12. A pair of diametrically opposed turbine blades 18 having hollow root portions 20 are rotatably journalled in the hub 10 by ball bearing means 22. The hollow root portion 20 of each blade is connected by means of a pin 24 to a stub shaft 26 having a threaded portion 28 which receives a nut 30. A washer 32 is interposed between the nut 30 and the inner race of each bearing means 22 for retaining the bearings in assembled relation with the hub.

An integral bearing support 34 is attached to the hub section 12 by a bolt 36. The inner ends of the stub shafts 26 are rotatably journalled in the bearing support 34 by ball bearing means 38. In addition, each stub shaft 26 has a worm gear sector 40 keyed thereto.

As seen in FIGURE 3, each worm gear sector 40 meshes with a worm 42 integral with a worm shaft 44 which is journalled by bearing means 46 and 48, respectively, in hub sections 12 and 14. Accordingly, the worm shafts 44 as well as the worm sectors 40 rotate with the hub 10 when the turbine is positioned in an air stream. Each worm shaft 44 has a gear 50 attached thereto, the function of which will be described hereinafter. In addition, a leaf spring member 52, attached to the hub section 12 by screws 54, cooperates with each worm gear sector 40 to limit the range of pitch adjustment of its respective blade 18. In the disclosed embodiment, the blades 18 have a range of pitch adjustment of substantially 90°, that is, from a substantially zero angle, or flat pitch position, to a positive 90° angle, or a full feathered pitch position.

The hub section 14 is formed with an integral longitudinal extending hollow shaft portion 56, opposite ends of which are journalled by ball bearing means 58 and 60 in the stationary housing, or frame, 62 of an accessory which is driven by the turbine. The accessory, which forms no part of this invention, may be a generator or a pump. The governor housing 64 is attached to the stationary accessory housing 62 by a plurality of screws 68. The open end of the governor housing 64 is closed by a cap 66 attached thereto by a plurality of screws 70, only one of which is shown in the drawings.

The hub shaft 56 has a gear 72 attached thereto by means of a lock nut assembly 74. The gear 72 meshes with a gear 76 having an equal pitch diameter, the gear 76 being attached to a stub shaft and gear assembly 78 by means of a nut 80. The gear and stub shaft assembly 78 is journalled by sleeve bearings 82 and 84 in the governor housing 64 and includes a gear 86 which meshes with a gear 88. The gear 86 has a pitch diameter substantially one-half the pitch diameter of the gear 88 whereby the gear 88 will rotate at one-half the speed of the turbine hub shaft 56 and in the same direction as the hub shaft 56. The gear 88 is integral with a shaft 90, opposite ends of which are journalled by ball bearing means 92 and 94.

As seen in FIGURE 4, the hollow stub shaft 90 is connected by means of a key 96 with a two-part yoke assembly 98. The yoke assembly 98 includes parts 100 and 102 connected by screws 104. The yoke assembly 98 is disposed within chamber 105 of the governor housing 64 which contains oil.

Three arms 106 are pivotally supported by bearing means 108 for angular movement relative to the yoke assembly 98. The arms 106 carry flyweights 110 adjacent their outer ends. In addition, the arms 106 have axle pins 112 press fitted therein about which rollers or wheels 114 are supported for rotation by bearing means 116. The arms 106 also carry pins 118 which, as seen in FIGURE 2, cooperate with a cutout portion 120 of the yoke assembly 98 to limit angular movement of the arms 106 due to the thrust of centrifugal force and the opposing force of spring means, to be described.

The rollers 114 engage a nonrotatable cam 122 which circumscribes the shaft 90 and is supported by a Belleville spring 124. The Belleville spring 124 is keyed to the cam 122 supported by a nonrotatable retainer 126 to which it is also keyed. The annular retainer 126 is slideable axially relative to the governor housing 64, but is restrained against rotation relative thereto by a plurality of pins 128 which are press fitted in the housing 64 and extend through openings in the annular retainer 126.

The stress of the Belleville spring 124, and hence the speed setting of the isochronous governor, can be adjusted. In the disclosed embodiment, the housing 64 has a pin 130 slideably mounted therein, one end of which engages the retainer 126 and the other end of which engages a nut 132 having threaded engagement with the boss 134 on the housing 64. The nut 132 carries a screw 136 which is engageable with the housing 64 to lock the nut and hence the pin 130 and the retainer 126 in the adjusted position, after the governor has been calibrated by movement of the nut 132.

The rollers 114 also engage a race member 138 having an integral hub projection 140 which is journalled on the governor end plate 66 by bearing means 142. The race member 138 is connected by means of a pin 144 with a master gear shaft 148 disposed coaxially of the hub shaft 56 and extending from the governor housing to the hub 10. The master gear shaft 148 is suitably keyed at 150 to a master gear 152, journalled by bearing means 154 and 156 for rotation relative to the hub section 14 and the bearing support 34. The worm shaft gears 50 mesh with master gear 152.

Operation of the isochronous governor is as follows. Upon rotation of the yoke assembly 98, the arms 106 will assume an angular position at which the thrust of centrifugal force tending to move the arms in the clockwise direction as viewed in FIGURE 2, is in equilibrium with the opposing force of the Belleville spring 124. In the equilibrium position of the arms 106, the rollers 114 will be rotated about their own axes as well as being rotated about the axis of the turbine due to rotation of the yoke 98. The rollers 114 will be rotated about their own axes since they engage the stationary cam 122. The rollers 114 will impart rotation to the race member 138, the speed of rotation of the race member being dependent upon the diameter of the drive circle between the race member and the rollers 114. The race member 138 and the master gear shaft 148, in the instant governor assembly, will be driven at a speed equal to turbine speed when the turbine is rotating at a speed equal to the speed setting of the isochronous governor. When turbine speed exceeds the speed setting of the isochronous governor the master gear shaft 148 will be driven at a speed less than turbine speed, in direct proportion to the speed difference between the governor speed setting and the turbine setting. Conversely, when turbine speed is less than the speed setting of the governor, the master gear shaft 148 will be driven at a speed faster than the turbine speed, again in direct proportion to the speed difference between the turbine and the governor speed setting.

The master gear 152 is rotated in the same direction as the hub 10 by the master gear shaft 148. Accordingly, when the master gear shaft is rotating at the same speed as the hub 10, that is, when the turbine is operating at the constant speed setting of the governor, there will be no relative rotation between the master gear and the pitch adjusting gears 50 since they are rotating in the same direction at the same speed about the axis of the hub 10. Accordingly, no angular movement will be imparted to the worm shafts 44. However, when turbine speed departs from the speed setting of the isochronous governor, the master gear 152 will be driven at a speed different than turbine speed, and accordingly there will be relative rotation between the gears 152 and 50 whereupon the worm shafts 44 will be rotated about their axes, therefore the worms 42 will drive the worm gear sectors 44 to vary the pitch position of the turbine blades. The pitch position of the turbine blades will be varied within the range of pitch adjustment so as to either increase or decrease the area of the turbine blades exposed to the air stream to thereby correct the turbine speed error until the turbine is again rotating at the speed setting of the governor.

While the embodiment of the invention as herein disclosed constitutes a preferred form, it is to be understood that other forms might be adopted.

What is claimed is as follows:

1. An air driven turbine including, a hub having a centrally disposed hollow hub shaft, a blade journalled in said hub for pitch adjustment and operable to impart rotation thereto when positioned in an air stream, pitch adjusting means for said blade, and isochronous governing means including an element coaxially mounted within said hub shaft and operable to actuate said pitch adjusting means so as to maintain turbine speed substantially constant.

2. An air driven turbine including, a hub having a centrally disposed hollow hub shaft portion, a blade journalled in said hub for pitch adjustment and operable to impart rotation thereto when positioned in an air stream, pitch adjusting means for said blade, means operable to actuate said pitch adjusting means including a shaft disposed within the hollow hub shaft portion, and isochronous governing means driven by said hub and operable to rotate said shaft to actuate said pitch adjusting means so as to maintain turbine speed substantially constant.

3. An air driven turbine including, a hub having a centrally disposed hollow hub shaft portion, a blade journalled in said hub for pitch adjustment and operable to impart rotation thereto when positioned in an air stream, pitch adjusting means for said blade including a gear rotatable with said hub, actuating means for said pitch adjusting means including a shaft coaxially disposed within said hollow hub shaft portion and operatively connected with said gear, and isochronous governing means driven by said hub for rotating said shaft to actuate said pitch adjusting means so as to maintain turbine speed substantially constant.

4. The air driven turbine set forth in claim 3 wherein said blade has a worm gear sector attached thereto, and wherein said gear is attached to a worm shaft having a worm meshing with said worm gear sector.

5. The air driven turbine set forth in claim 4 including stop means engageable with said worm gear sector for limiting the range of pitch adjustment of said blade.

6. The air driven turbine set forth in claim 3 wherein said shaft has a gear attached thereto which meshes with the gear of the pitch adjusting means, said shaft gear being driven in the same direction as said hub whereby the pitch position of said blades will not be adjusted when the speed of rotation of said hub is the same as the speed of rotation of said shaft gear.

7. An air driven turbine including, a hub having a centrally disposed hollow hub shaft portion, a plurality of blades journalled in said hub for pitch adjustment and operable to impart rotation thereto when positioned in an air stream, a sector gear connected to each blade, pitch adjusting means engageable with each sector gear for effecting concurrent pitch adjustment of said blades, actuating means for said pitch adjusting means including a shaft disposed within said hollow hub shaft portion, and isochronous governing means driven by said hub for rotating said shaft to actuate said pitch adjusting means so as to maintain turbine speed substantially constant.

References Cited in the file of this patent

UNITED STATES PATENTS

| 2,164,489 | Berliner | July 4, 1939 |
| 2,196,654 | Bertran | Apr. 9, 1940 |
| 2,550,229 | Cotton | Apr. 24, 1951 |
| 2,655,604 | Hutter | Oct. 13, 1953 |
| 2,696,888 | Chillson et al. | Dec. 14, 1954 |
| 2,738,183 | Quinn et al. | Mar. 13, 1956 |
| 2,771,286 | Clark | Nov. 20, 1956 |
| 2,777,524 | Chapman | Jan. 15, 1957 |
| 2,973,041 | Rabinow | Feb. 28, 1961 |

FOREIGN PATENTS

| 667,019 | Great Britain | Feb. 20, 1952 |